United States Patent
Balestra et al.

(10) Patent No.: US 10,792,637 B2
(45) Date of Patent: Oct. 6, 2020

(54) METHOD FOR FEEDING A FLUID TO A GAS PHASE POLYMERIZATION REACTOR

(71) Applicant: BASELL POLIOLEFINE ITALIA S.R.L., Milan (IT)

(72) Inventors: Enrico Balestra, Ferrara (IT); Tiziana Caputo, Ferrara (IT); Massimo Covezzi, Ferrara (IT); Maurizio Dorini, Ferrara (IT); Antonio Mazzucco, Ferrara (IT); Gabriele Mei, Houston, TX (US); Ricardo Rinaldi, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 16/477,283

(22) PCT Filed: Dec. 15, 2017

(86) PCT No.: PCT/EP2017/082977
§ 371 (c)(1),
(2) Date: Jul. 11, 2019

(87) PCT Pub. No.: WO2018/134007
PCT Pub. Date: Jul. 26, 2018

(65) Prior Publication Data
US 2019/0336930 A1    Nov. 7, 2019

(30) Foreign Application Priority Data

Jan. 20, 2017   (EP) .................................... 17152464

(51) Int. Cl.
| | | |
|---|---|---|
| *B01J 8/24* | (2006.01) | |
| *B01J 8/18* | (2006.01) | |
| *C08F 2/01* | (2006.01) | |
| *C08F 2/44* | (2006.01) | |

(52) U.S. Cl.
CPC ............... *B01J 8/24* (2013.01); *B01J 8/1818* (2013.01); *C08F 2/01* (2013.01); *C08F 2/44* (2013.01); *B01J 2208/00938* (2013.01); *B01J 2208/00991* (2013.01)

(58) Field of Classification Search
CPC ... B01J 8/1818; B01J 8/24; C08F 2/01; C08F 2/44
USPC .................................................. 523/318, 330
See application file for complete search history.

(56) References Cited

U.S. PATENT DOCUMENTS

| | | | |
|---|---|---|---|
| 6,111,034 A | 8/2000 | Goode et al. | |
| 2015/0344593 A1* | 12/2015 | Sarma | C08F 10/00 526/126 |

FOREIGN PATENT DOCUMENTS

| | | |
|---|---|---|
| EP | 0856530 A2 | 8/1998 |
| EP | 1083192 A1 | 3/2001 |

OTHER PUBLICATIONS

International Search Report and Written Opinion dated Feb. 27, 2018 for Corresponding PCT/EP2017/082977.

* cited by examiner

*Primary Examiner* — Edward J Cain (57) ABSTRACT

A fluid is fed into a polymer bed of a fluidized bed gas phase polymerization reactor by introducing the fluid into the polymer bed through a distributor protruding into the fluidized bed zone of the reactor and terminating with a discharge end positioned so that the following equation is fulfilled:

$$d/D > 0.002$$

wherein d is the distance of the distributor's discharge end from the wall of the reactor, and D is the diameter of the reactor in the fluidized bed zone.

11 Claims, 3 Drawing Sheets

METHOD FOR FEEDING A FLUID TO A GAS PHASE POLYMERIZATION REACTOR

This application is the U.S. National Phase of PCT International Application PCT/EP2017/082977, filed Dec. 15, 2017, claiming benefit of priority to European Patent Application No. 17152464.8, filed Jan. 20, 2017, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to gas phase processes for the polymerization of olefins. More particularly, the present disclosure relates to a method for feeding a fluid into a fluidized bed gas phase polymerization reactor.

BACKGROUND OF THE INVENTION

When a controlled flow rate of a fluid is to be fed into the polymer bed of a fluidized bed gas phase polymerization reactor, such fluid should contact the polymer particles as uniformly as possible.

In some instances, fluids to be fed into a fluidized bed gas phase polymerization reactor provide antifouling or antistatic effect.

In some instances, the stability of fluidized-bed gas-phase polymerization reactors is negatively affected by the presence of electrostatic charges, hot spots, and low polymer flowability. In some instances, those factors jeopardize the operation of the reactor with fouling, sheeting and blockage of the discharge valve(s), resulting in a shut down.

Antistatic agents are used in processes for the polymerization of olefins to avoid electrostatic charging to reduce wall sheeting and formation of polymer agglomerates in the polymerization reactor or in downstream equipment such as degassing and recovery vessels. In the context of olefin polymerization, antistatic agents are also called antifouling agents, polymerization process aids, activity inhibitors, productivity inhibitors or kinetic modifiers. The antistatic agents are made from or contain antistatically-acting compounds which have polar functional groups such as acid or ester groups, amine or amide groups or hydroxyl or ether groups. In some instances, antistatically-acting compounds are selected from the group consisting of polysulfone copolymers, polymeric polyamines, polyalcohols, hydroxyesters of polyalcohols, salts of alkylarylsulfonic acids, polysiloxanes, alkoxyamines, and polyglycol ethers.

In some instances, dispersion of a liquid co-catalyst in a gas phase reactor affects the homogeneity of the resulting polymer.

SUMMARY OF THE INVENTION

In a general embodiment, the present disclosure provides a method for feeding a fluid into a polymer bed of a fluidized bed gas phase polymerization reactor including the step of introducing a controlled and continuous flow rate of the fluid into the polymer bed through a distributor protruding into the fluidized bed zone of the reactor and terminating with a discharge end positioned so that the following equation is fulfilled:

$$d/D > 0.002$$

wherein
d is the distance of the distributor's discharge end from the wall of the reactor, and
D is the diameter of the reactor in the fluidized bed zone.

In a general embodiment, the present disclosure also provides a fluidized bed gas phase polymerization reactor including a distributor protruding into the fluidized bed zone of the reactor and terminating with a discharge end positioned so that the following equation is fulfilled:

$$d/D > 0.002$$

wherein
d is the distance of the distributor's discharge end from the wall of the reactor, and
D is the diameter of the reactor in the fluidized bed zone.

In a general embodiment, the present disclosure further provides a process for the preparation of polyolefins, including the step of feeding a fluid into a polymer bed of a fluidized bed gas phase polymerization reactor by introducing a controlled and continuous flow rate of the fluid into the polymer bed through a distributor protruding into the fluidized bed zone of the reactor and terminating with a discharge end positioned so that the following equation is fulfilled:

$$d/D > 0.002$$

wherein
d is the distance of the distributor's discharge end from the wall of the reactor, and
D is the diameter of the reactor in the fluidized bed zone.

DETAILED DESCRIPTION OF THE INVENTION

Fluidized-bed polymerization reactors are reactors in which the polymerization takes place in a bed of polymer particles which is maintained in a fluidized state by feeding in gas at the lower end of a reactor and taking off the gas again at its upper end. In some instances, the gas is feed below a gas distribution grid having the function of dispensing the gas flow. The reactor gas is then returned to the lower end to the reactor via a recycle line equipped with a compressor and a heat exchanger. In some instances, the circulated reactor gas is a mixture of the olefins to be polymerized, inert gases, and optionally a molecular weight regulator. In some instances, the inert gases include nitrogen or lower alkanes. In some instances, the lower alkanes are selected from the group consisting of ethane, propane, butane, pentane and hexane. In some instances, the molecular weight regulator is hydrogen. In some embodiments, nitrogen or propane is used as inert gas. In some embodiments, the nitrogen or propane is used in combination with further lower alkanes. The velocity of the reactor gas firstly fluidizes the mixed bed of finely divided polymer present in the tube serving as polymerization zone and secondly removes the heat of polymerization. In some embodiments, the polymerization is carried out in a condensed or super-condensed mode, wherein part of the circulating reaction gas is cooled to below the dew point and returned to the reactor separately as a liquid and a gas-phase or together as a two-phase mixture to make additional use of the enthalpy of vaporization for cooling the reaction gas.

In some embodiments, the following equations are alternatively fulfilled: d/D>0.005; d/D>0.010; d/D>0.015; d/D>0.020; wherein d is the distance of the distributor's discharge end from the wall of the reactor, and D is the diameter of the reactor in the fluidized bed zone.

In some embodiments, a head loss is generated through orifices in the distributor such that a Reynolds number (Re) of from 10000 to 700000, or from 20000 to 500000, or from 30000 to 300000 is achieved.

In some embodiments, the fluid is an antistatic compound or composition. In other embodiments, the fluid is a catalyst or catalyst component, such as a cocatalyst.

In one embodiment, the fluid is an antistatic composition made from or containing (with respect to the total weight of the antistatic composition):
  (a) from 0.5 to 50% by weight of a compound of formula R—OH wherein R represents hydrogen or a linear or branched, saturated alkyl group having from 1 to 15 carbon atoms; and
  (b) from 50 to 99.5% by weight of an oligomeric or polymeric organic compound having one or more terminal hydroxyl groups and a viscosity at 40° C. of at least 20 mm$^2$/sec (DIN 51562).

In one embodiment, the compound (a) of formula R—OH is water. According to other embodiments, the compound (a) of formula R—OH is an alcohol selected from methanol, ethanol, 1-propanol, 1-butanol, 1-pentanol, 1-hexanol, 1-heptanol, 1-octanol, 1-nonanol, 1-decanol, undecan-1-ol, dodecan-1-ol, tridecan-1-ol, 1-tetradecanol, pentadecan-1-ol, isobutanol, isoamyl alcohol, 2-methyl-1-propanol, phenethyl alcohol, tryptophol, isopropanol, 2-butanol, 2-pentanol, 2-hexanol, 2-heptanol, cyclohexanol, tert-butyl alcohol, tert-amyl alcohol, 2-methyl-2-pentanol, 2-methylhexan-2-ol, 2-methylheptan-2-ol, 3-methyl-3-pentanol and 3-methyloctan-3-ol.

In some embodiments, the oligomeric or polymeric organic compound (b) has a viscosity at 40° C. (DIN 51562) of 30-2000 mm$^2$/sec, or of 50-1500 mm$^2$/sec, or of 100-1000 mm$^2$/sec, or of 150-500 mm$^2$/sec, or of 200-400 mm$^2$/sec, or of 250-300 mm$^2$/sec, or of 260-285 mm$^2$/sec. In some embodiments, the viscosity at 40° C. (DIN 51562) of the oligomeric or polymeric organic compound (b) is in the range of 260 to 285 mm$^2$/sec.

In some embodiments, the oligomeric or polymeric organic compound (b) is selected from alcohols, polyethers, polyalcohols, hydroxyesters of polyalcohols, polyglycol ethers, polyglycol esters and derivatives thereof.

In some embodiments, the oligomeric or polymeric organic compound (b) is a polyether. In some embodiments, the oligomeric or polymeric organic compound (b) is an alkylene-oxide-derived polymer made from or containing on average from 10 to 200 repeating units —(CH$_2$—CHR—O)—, with R being hydrogen or an alkyl group having from 1 to 6 carbon atoms.

In some embodiments, the terminal groups of the alkylene-oxide-derived polymer are —OH groups.

In some embodiments, the alkylene-oxide-derived polymer is a random copolymer of ethylene oxide and of other alkylene oxides, and the repeating units µ(CH$_2$—CH$_2$—O)$_n$— derived from ethylene oxide to repeating units —(CH$_2$—CHR'—O)$_m$— derived from the other alkylene oxides, with R' being an alkyl group having from 1 to 6 carbon atoms, are present in a ratio n:min the range of from 6:1 to 1:1, or in the range of from 5:1 to 1.5:1, or further in the range of from 4:1 to 2:1.

In some embodiments, the alkylene-oxide-derived polymer is a linear polymer of general formula (I)

HO—(CH$_2$—CH$_2$—O)$_n$—(CH$_2$—CHR'—O)$_m$—H (I)

wherein R' is an alkyl group having from 1 to 6 carbon atoms, or an alkyl group having from 1 to 3 carbon atoms, or a methyl group; n is in the range of from 10 to 180, or from 20 to 100, or from 30 to 50; m is in the range of from 2 to 120, or from 10 to 80, or from 10 to 40; n and m denoting the average number of repeating units.

In some embodiments, alkylene-oxide-derived polymer is a random copolymer of ethylene oxide and propylene oxide.

In some embodiments, the ethylene oxide/propylene oxide copolymer is a linear ethylene oxide/propylene oxide copolymer of general formula (II)

HO—(CH$_2$—CH$_2$—O)$_n$—(CH$_2$—CH(CH$_3$)—O)$_m$—H (II)

wherein n is in the range of from 10 to 180, or from 20 to 100, or from 30 to 50 and m is in the range of from 2 to 120, or from 10 to 80, or from 10 to 40.

In some embodiments, alkylene-oxide-derived polymers for use in the process of the present disclosure are prepared by reacting ethylene oxide and the other alkylene oxides with polyhydric alcohols. In some embodiments, the other alkylene oxide is propylene oxide. In some embodiments, the polyhydric alcohols are diols, triols, or polyols. In some embodiments, the diol is ethylene glycol. In some embodiments, the triol is glycerol. In some embodiments, the polyol is pentaerythritol. The reaction with diols results in linear polymers.

In some embodiments, the oligomeric or polymeric organic compound (b) is water-soluble. As used herein, the term "water-soluble" refers to soluble in water at room temperature. As used herein, the term "room temperature" is at about 23° C.

According to embodiments of the disclosure, the amount of antistatic composition introduced into the polymerization reactor is from 1 to 5000 ppm per weight, or from 10 to 3000 ppm per weight, or from 50 to 1000 ppm per weight referring to the weight of the prepared polyolefin.

According to embodiments of the disclosure, the amount of component (a) introduced into the polymerization reactor is from 1 to 70 ppm per weight, or from 1 to 50 ppm per weight, or from 2 to 40 ppm per weight, or from 2 to 30 ppm per weight, or from 3 to 30 ppm per weight, or from 3 to 20 ppm per weight referring to the weight of the prepared polyolefin.

According to embodiments of the disclosure, the amount of component (a) in the antistatic composition introduced into the polymerization reactor is from 0.5 to 50% by weight, or from 3 to 30% by weight, or from 5 to 15% by weight with respect to the total weight of antistatic composition.

According to embodiments of the disclosure, the amount of component (b) in the antistatic composition introduced into the polymerization reactor is from 50 to 99.5% by weight, or from 70 to 97% by weight, or from 85 to 95% by weight with respect to the total weight of antistatic composition.

In some embodiments, the antistatic composition of the present disclosure is provided to the polymerization process as a pre-prepared mixture. According to another method of operation, components (a) and (b) of the antistatic composition are separately provided to the polymerization process.

In some embodiments, the antistatic composition or individual components thereof are fed to the polymerization reactor in a flow of saturated or unsaturated hydrocarbon having from 2 to 6 carbon atoms that. In some embodiments, the hydrocarbon is a monomer or an alkane. In some embodiments, the monomer is propylene. In some embodiments, the alkane is propane. In some embodiments, the monomer and the alkane are in liquid or gas form.

In some embodiments, the antistatic composition or components and the hydrocarbon are homogenized at short distance from the distributor to create an emulsion or fog of small droplets of the antistatic dispersed phase into the hydrocarbon continuous phase. In some embodiments, the homogenization occurs by mixing/homogenizing/dispersing systems, including static mixers or atomizers/nebulizers.

According to another embodiment, the antistatic composition or components and the hydrocarbon are homogenized inside the distributor, whereby the distributor acts as a mixing/homogenizing/dispersing system to create an emulsion or fog of droplets of the antistatic dispersed phase into the hydrocarbon continuous phase.

According to embodiments wherein the components of the antistatic composition are fed separately to the polymer bed, one component is fed through a distributor according to the present disclosure, while the other component is fed:
  upstream or into a catalyst precontacting vessel;
  upstream or into a prepolymerization reactor;
  at any other point upstream the polymerization reactor;
  distributed in any recirculation flow of the reactor.
As used herein, the term "catalyst precontacting vessel" refers to a vessel wherein the catalyst components are brought into contact with each other.

In some embodiments, the present disclosure provides a process for the polymerization of olefins. In some embodiments, the olefins are 1-olefins which are hydrocarbons having terminal double bonds, conjugated and non-conjugated dienes, vinyl-aromatic compounds, or olefins having a double bond as part of a cyclic structure with one or more ring systems. In some embodiments, 1-olefins are linear or branched 1-alkenes having from 2 to 12 carbon atoms. In some embodiments, the linear 1-alkenes having from 2 to 10 carbon atoms are selected from the group consisting of ethylene, propylene, 1-butene, 1-pentene, 1-hexene, 1-heptene, 1-octene, and 1-decene. In some embodiments, the branched 1-alkenes having from 2 to 10 carbon atoms are 4-methyl-1-pentene. In some embodiments, the conjugated and non-conjugated dienes are selected from the group consisting of 1,3-butadiene, 1,4-hexadiene and 1,7-octadiene. In some embodiments, the vinyl-aromatic compounds are styrene or substituted styrene. In some embodiments, the olefins are mixtures of various 1-olefins. In some embodiments, olefins having a double bond as part of a cyclic structure with one or more ring systems are selected from the group consisting of cyclopentene, norbornene, tetracyclododecene, methylnorbornene and dienes such as 5-ethylidene-2-norbornene, norbornadiene or ethylnorbornadiene. In some embodiments, the process is to polymerize mixtures of two or more olefins.

In some embodiments, the process is used for the homopolymerization or copolymerization of ethylene or for the homopolymerization or copolymerization of propylene. According to an embodiment, comonomers for use in ethylene polymerization are 1-alkenes having from 3 to 8 carbon atoms such as 1-butene, 1-pentene, 1-hexene, or 1-octene in amount of up to 20 wt. % or from 0.01 wt. % to 15 wt. %, or from 0.05 wt. % to 12 wt. %. According to another embodiment, comonomers for use in propylene polymerization are ethylene, 1 butene, or 1-hexene in amount of up to 40 wt. % or from 0.5 wt. % to 35 wt. %.

In some embodiments, the prepared olefin polymers are broad molecular weight olefin polymers. In some embodiments, the prepared olefin polymers are multimodal olefin polymers. As used herein, the term "multimodal" refers to the modality of the molecular weight distribution. As used herein, the term "multimodal" includes bimodal. In some embodiments, the polymers are obtained from polymerizing olefins in a cascade of two or more polymerization reactors or in different zones of a multizone reactor under different reaction conditions. Thus, the "modality" indicates how many different polymerization conditions were utilized to prepare the polyolefin, independent of whether the modality of the molecular weight distribution is recognized as separated maxima in a gel permeation chromatography (GPC) curve. In some embodiments and in addition to the molecular weight distribution, the olefin polymer has a comonomer distribution. In an embodiment, the average comonomer content of polymer chains with a higher molecular weight is higher than the average comonomer content of polymer chains with a lower molecular weight. In some embodiments, identical or very similar reaction conditions in the polymerization reactors of the reaction cascade are employed, thereby yielding narrow molecular weight or monomodal olefin polymers.

In some embodiments, various olefin polymerization catalysts are used. In some embodiments, the polymerization is carried out using titanium-based Ziegler-Natta-catalysts, Phillips catalysts based on chromium oxide, or single-site catalysts. For the purposes of the present disclosure, single-site catalysts are catalysts based on chemically uniform transition metal coordination compounds. In some embodiments, mixtures of two or more of these catalysts are used for the polymerization of olefins. In some embodiments, the mixed catalysts are designated as hybrid catalysts.

According to an embodiment, catalysts for the process of the present disclosure are Ziegler-Natta catalysts are made from or contain:
(i) a solid catalyst component made from or containing Mg, Ti, an halogen and a first electron donor compound (internal donor),
(ii) an alkylaluminum compound, and
(iii) optionally, a second electron-donor compound (external donor).

In some embodiments, component (i) is prepared by contacting a magnesium halide, a titanium compound having at least a Ti-halogen bond, and optionally an electron donor compound. In some embodiments, the magnesium halide is $MgCl_2$ in active form. In some embodiments, $MgCl_2$ is a support for Ziegler-Natta catalysts. In some embodiments, the titanium compounds are $TiCl_4$ or $TiCl_3$. In some embodiments, the titanium compounds are Ti-haloalcoholates of formula $Ti(OR)_{n-y}X_y$, where n is the valence of titanium, y is a number between 1 and n−1 X is halogen and R is a hydrocarbon radical having from 1 to 10 carbon atoms.

In some embodiments, electron donor compounds for preparing Ziegler type catalysts are selected from the group consisting of alcohols, glycols, esters, ketones, amines, amides, nitriles, alkoxysilanes and aliphatic ethers. In some embodiments, these electron donor compounds are used alone or in mixtures with other electron donor compounds.

In some embodiments, other solid catalyst components are based on a chromium oxide supported on a refractory oxide, such as silica, and activated by a heat treatment. Catalysts obtainable from those components consist of chromium (VI) trioxide chemically fixed on silica gel. These catalysts are produced under oxidizing conditions by heating the silica gels that have been doped with chromium(III)salts (precursor or precatalyst). During this heat treatment, the chromium(III) oxidizes to chromium(VI), the chromium (VI) is fixed and the silica gel hydroxyl group is eliminated as water.

In some embodiments, other solid catalyst components are single-site catalysts supported on a carrier, such as metallocene catalysts made from or containing:

at least a transition metal compound containing at least one n bond; and at least a cocatalyst selected from an alumoxane or a compound able to form an alkylmetallocene cation.

According to embodiments of the disclosure, when the catalyst includes an alkylaluminum compound, such as in Ziegler Natta catalysts, the molar ratio of component (a) to alkylaluminum compound introduced into the polymerization reactor is from 0.05 to 3, or from 0.1 to 2, or from 0.5 to 1.

In some embodiments, the catalysts are subjected to prepolymerization before being fed to the polymerization reactor. In an embodiment the prepolymerization occurs in a loop reactor. In some embodiments, the prepolymerization of the catalyst system is carried out at a low temperature. In some embodiments, the temperature is in a range of from 0° C. to 60° C.

According to some embodiments, the fluid catalyst or one or more catalyst components, such as the cocatalyst, are fed with the method of this disclosure.

In some embodiments, the process of the present disclosure is carried in two or more cascade reactors, giving rise to a sequential multistage polymerization process. In some embodiments, the fluidized bed gas phase reactor is preceded or followed by one or more liquid-phase or gas-phase polymerization reactors. In some embodiments, liquid-phase reactors are loop reactors and continuously stirred tank reactors (CSTR). In some embodiments, gas-phase reactors are fluidized bed reactors, stirred bed reactors or reactors having two interconnected polymerization zones as described in European Patent Application Nos. EP 0782587 and EP 1012195.

In some embodiments, a fluidized bed reactor is used to prepare a first polymer component, which is successively fed to a gas-phase reactor having two interconnected polymerization zones to prepare a second and a third polymer component. In some embodiments, a first fluidized bed reactor is used to prepare a first polymer component, which is successively fed to a second fluidized bed reactor to prepare a second polymer component and then to a third fluidized bed reactor to prepare a third polymer component. In some embodiments, an olefin polymer endowed with a multi-modal molecular weight distribution is obtained. In some embodiments, an olefin copolymer made from or containing two or more components having a different comonomer content is obtained.

In some embodiments, gas-phase polymerization reactors other than fluidized bed gas-phase reactors are horizontally or vertically stirred reactors or multizone circulating reactors.

Multizone circulating reactors are gas-phase reactors in which two polymerization zones are linked to one another and the polymer is passed alternately a plurality of times through these two zones. In some embodiments, the reactors are as described in Patent Cooperation Treaty Publication Nos. WO 97/04015 A1 and WO 00/02929 A1 and have two interconnected polymerization zones, a riser, wherein the growing polymer particles flow upward under fast fluidization or transport conditions and a downcomer, wherein the growing polymer particles flow in a densified form under the action of gravity. The polymer particles leaving the riser enter the downcomer and the polymer particles leaving the downcomer are reintroduced into the riser, thereby establishing a circulation of polymer between the two polymerization zones and the polymer is passed alternately a plurality of times through these two zones. In some embodiments, the two polymerization zones of a multizone circulating reactor are operated with different polymerization conditions by establishing different polymerization conditions in each polymerization zone's riser and each polymerization zone's downcomer. In some embodiments, the gas mixture leaving the riser and entraining the polymer particles is partially or totally prevented from entering the downcomer. In some embodiments, prevention is achieved by feeding a barrier fluid in form of a gas or a liquid mixture into the downcomer, in the upper part thereof. The barrier fluid has a composition, different from that of the gas mixture present in the riser. In some embodiments, the amount of added barrier fluid is adjusted such that an upward flow of gas countercurrent to the flow of the polymer particles is generated, acting as a barrier to the gas mixture entrained among the particles coming from the riser. In some embodiments, the countercurrent is at the top. In some embodiments, make-up monomers, comonomers, molecular weight regulator such as hydrogen or inert fluids are introduced at any point of the downcomer, below the barrier feeding point. In some embodiments, varying monomer, comonomer and hydrogen concentrations are provided along the downcomer, resulting in a further differentiation of the polymerization conditions.

In a gas-phase polymerization process, the solid polymers are obtained from the polymerization of the monomer or the monomers. In some embodiments, gas-phase polymerizations are carried out at pressures of from 0.1 to 20 MPa, or from 0.5 to 10 MPa, or from 1.0 to 5 MPa and polymerization temperatures from 40 to 150° C. or from 65 to 125° C.

A fluidized bed gas phase polymerization reactor, representing an embodiment of the disclosure, will now be described in detail with reference to FIG. 1.

A solid catalyst component 1, a stream 2 containing the cocatalyst and an external donor compound, optionally in the presence of propylene, are fed to a pre-contacting vessel 3 together with a diluent, such as propane.

The obtained catalyst system is continuously fed via line 4 to a loop prepolymerization reactor 5, and simultaneously liquid propylene is fed to the reactor 5 via line 6, optionally together with an alkane, such as propane.

The prepolymerized catalyst system discharged from the loop reactor 5 is fed via line 7 to a fluidized bed reactor 8.

Figure 1:
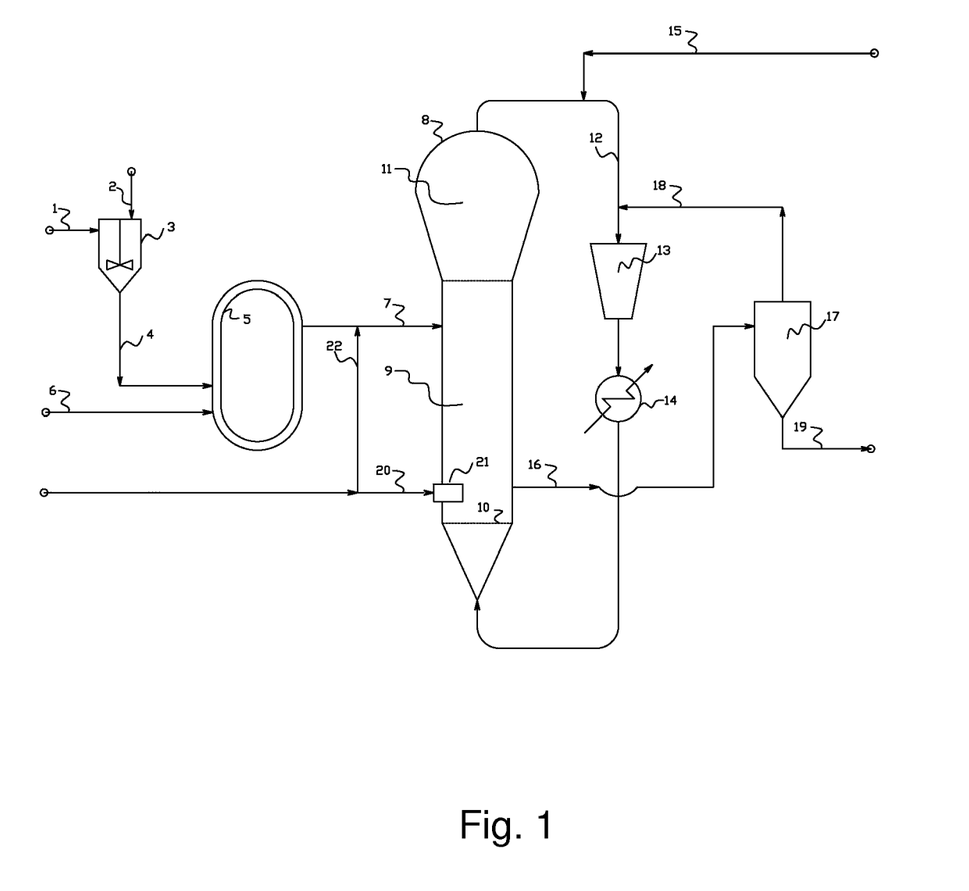
FIG. 1 depicts schematically a fluidized bed gas phase polymerization reactor for carrying out the process for the preparation of polyolefins of the present disclosure, without however restricting the invention to the embodiments illustrated therein.

The fluidized bed reactor 8 of FIG. 1 includes a fluidized bed 9 of growing polymer particles, a fluidization plate 10 and a velocity reduction zone 11. In some embodiments, the velocity reduction zone 11 is of increased diameter compared to the diameter of the fluidized bed portion of the reactor. The gaseous stream leaving the top of the velocity reduction zone 11 is transferred via the recycle line 12 to a compressor 13 and then to a heat exchanger 14. The recycle line 12 is equipped with a line 15 for feeding propylene, hydrogen, inert gases and, optionally comonomers. Passing through the heat exchanger 14, the gaseous stream is cooled and then fed to the bottom of the fluidized bed reactor 8. In this way the upwardly flowing gas continuously maintains the bed of polymer particles in fluidization conditions.

The polymer obtained in reactor 8 is discharged from the lower part of the fluidized bed 9 and fed via line 16 to a solid/gas separator 17. The gaseous mixture is fed back to the recycle line 12 through line 18 while the separated polymer is fed via line 19 to the next sections of the plant.

In some embodiments, the antistatic composition is added into the fluidized bed reactor 8 via line 20 through a distributor 21 protruding into the fluidized bed zone 9 of the reactor. In some embodiments, the antistatic composition is also added via an injection point 22 on line 7 exiting from the prepolymerization reactor 5 and entering the fluidized bed reactor 8.

According to an embodiment, the gas-phase polymerization processes according to the present disclosure are carried out in the presence of an alkane having from 3 to 5 carbon atoms as polymerization diluent. In some embodiments, the diluent is propane.

In some embodiments, the process of the present disclosure prevents or reduces the formation of polymer agglomerates in the polymerization reactors and fluctuations in the fluid-dynamics of the reactor.

EXAMPLES

The following examples are given to illustrate the present invention without any limiting purpose.

Test Methods

Melt Flow Rate (MFR "L")

Determined according to ISO 1133 (230° C., 2.16 Kg)

Ethylene Content in Copolymers

The content of ethylene comonomer was determined by infrared spectroscopy by collecting the IR spectrum of the sample vs. an air background with a Fourier Transform Infrared spectrometer (FTIR). The instrument data acquisition parameters were:
  purge time: 30 seconds minimum
  collect time: 3 minutes minimum
  apodization: Happ-Genzel
  resolution: 2 cm$^{-1}$.

Sample Preparation—Using a hydraulic press, a thick sheet was obtained by pressing about 1 g of sample between two aluminum foils. A small portion was cut from this sheet to mold a film. The film thickness ranged between 0.02 and 0.05 cm (8-20 mils). Pressing temperature was 180±10° C. (356° F.) and about 10 kg/cm2 (142.2 PSI) pressure for about one minute. The pressure was released. The sample was removed from the press and cooled to room temperature.

The spectrum of pressed film sample was recorded in absorbance vs. wavenumbers (cm−1). The following measurements were used to calculate ethylene content:

Area (At) of the combination absorption bands between 4482 and 3950 cm$^{-1}$, used for spectrometric normalization of film thickness;

Area (AC2) of the absorption band between 750-700 cm$^{-1}$ after two proper consecutive spectroscopic subtractions of an isotactic non-additivated polypropylene spectrum and then of a reference spectrum of an ethylene-propylene random copolymer in the range 800-690 cm$^{-1}$;

Height (DC4) of the absorption band at 769 cm$^{-1}$ (maximum value), after two proper consecutive spectroscopic subtractions of an isotactic non-additivated polypropylene spectrum and then of a reference spectrum of an ethylene-propylene random copolymer in the range 800-690 cm'.

To calculate the ethylene content, a calibration straight line for ethylene was obtained from reference samples of ethylene and plotting AC2/At versus ethylene molar percent (% C2m). The slope GC2 was calculated from a linear regression.

The spectra of the test specimens were recorded and then (At), (AC2) and (DC4) calculated. The ethylene content by weight was obtained from the ethylene content (% molar fraction C2m) of the sample calculated as follows:

$$\% \; C2m = \frac{1}{G_{C2}} \cdot \frac{A_{C2}}{A_t}$$

Xylene Solubles (XS)

Determined as follows: 2.5 g of polymer and 250 ml of xylene were introduced in a glass flask equipped with a refrigerator and a magnetic stirrer. The temperature was raised to the boiling point of the solvent in 30 minutes. The clear solution obtained was kept under reflux and stirring for 30 additional minutes. The closed flask was kept in thermostatic water bath at 25° C. for 30 minutes. The solid was filtered on quick filtering paper. 100 ml of the filtered liquid was poured in a previously-weighed aluminum container, which was heated on a heating plate under nitrogen flow to remove the solvent by evaporation. The container was kept in an oven at 80° C. under vacuum until constant weight was obtained. The weight percentage of polymer soluble in xylene at room temperature was then calculated.

Example 1

Preparation of the Ziegler-Natta Solid Catalyst Component

An initial amount of microspheroidal MgCl$_2$.2.8C$_2$H$_5$OH adduct was prepared according to the method described in Example 2 of Patent Cooperation Treaty Publication No. WO98/44009, operating on larger scale. The adduct was partially dealcoholated in a nitrogen flow until the alcohol content reached the value of 50% wt based on the total weight of the adduct.

300 ml of TiCl4 were introduced at room temperature under nitrogen atmosphere into a 500 ml round bottom flask, equipped with mechanical stirrer, cooler and thermometer. After cooling to 0° C., while stirring, diisobutylphthalate (internal donor) and 9.0 g of the adduct were sequentially added into the flask. The amount of internal donor added met a Mg/donor molar ratio of 8. The temperature was raised to 100° C. and maintained for 2 hours. Thereafter, stirring was stopped. The solid product was allowed to settle. The supernatant liquid was siphoned off at 100° C. After the supernatant was removed, additional fresh TiCl4 was added to reach the initial liquid volume again. The mixture was then heated at 120° C. and kept at this temperature for 1 hour. Stirring was stopped again. The solid was allowed to settle. The supernatant liquid was siphoned off. The solid was washed with anhydrous hexane six times in temperature gradient down to 60° C. and one time at room temperature. The obtained solid was then dried under vacuum and analyzed.

Catalyst Activation and Prepolymerization

The solid catalyst component prepared was contacted with aluminum-triethyl (TEAL) and with dicyclopentyl-dimethoxysilane (donor D) under the conditions reported in Table 1.

The activated catalyst discharged from the activation vessel was continuously fed, together with liquid propylene, to a prepolymerization loop reactor operated at a temperature of 20° C. and a residence time of 7 minutes.

Polymerization

The polymerization run was conducted in continuous mode in a fluidized bed gas-phase reactor as illustrated in FIG. 1, having a diameter of 40 cm in the fluidized bed zone. The prepolymerized catalyst was discharged from the prepolymerization reactor and continuously fed to a fluidized bed gas-phase reactor where an ethylene-propylene copolymer was prepared. Liquid propylene, ethylene and hydrogen as molecular weight regulator were fed to reactor 8 via line 15 into the recycle line 12.

An antistatic composition made from or containing 7% w of water and 93% w of Polyglykol PE-K 270 commercialized by Clariant was fed into the polymer bed partly through an injection point 22 on line 7 exiting from the prepolymerization reactor 5 and entering the fluidized bed reactor 8 and partly via a distributor 21 protruding into fluidized bed zone 9 and terminating with a discharge end positioned 10 cm from the wall of the reactor. The flow rate of the antistatic composition feed was such as to obtain in the polymer the amounts of antistatic indicated in Table 1 and split 50/50 between the two injection points. The gas phase (propylene, ethylene and hydrogen) was continuously analyzed via gas-chromatography. At the end of the run the powder was discharged and dried under a nitrogen flow.

The main polymerization conditions and polymer features are reported in Table 1 together with the effect of the antistatic composition.

Figure 2:
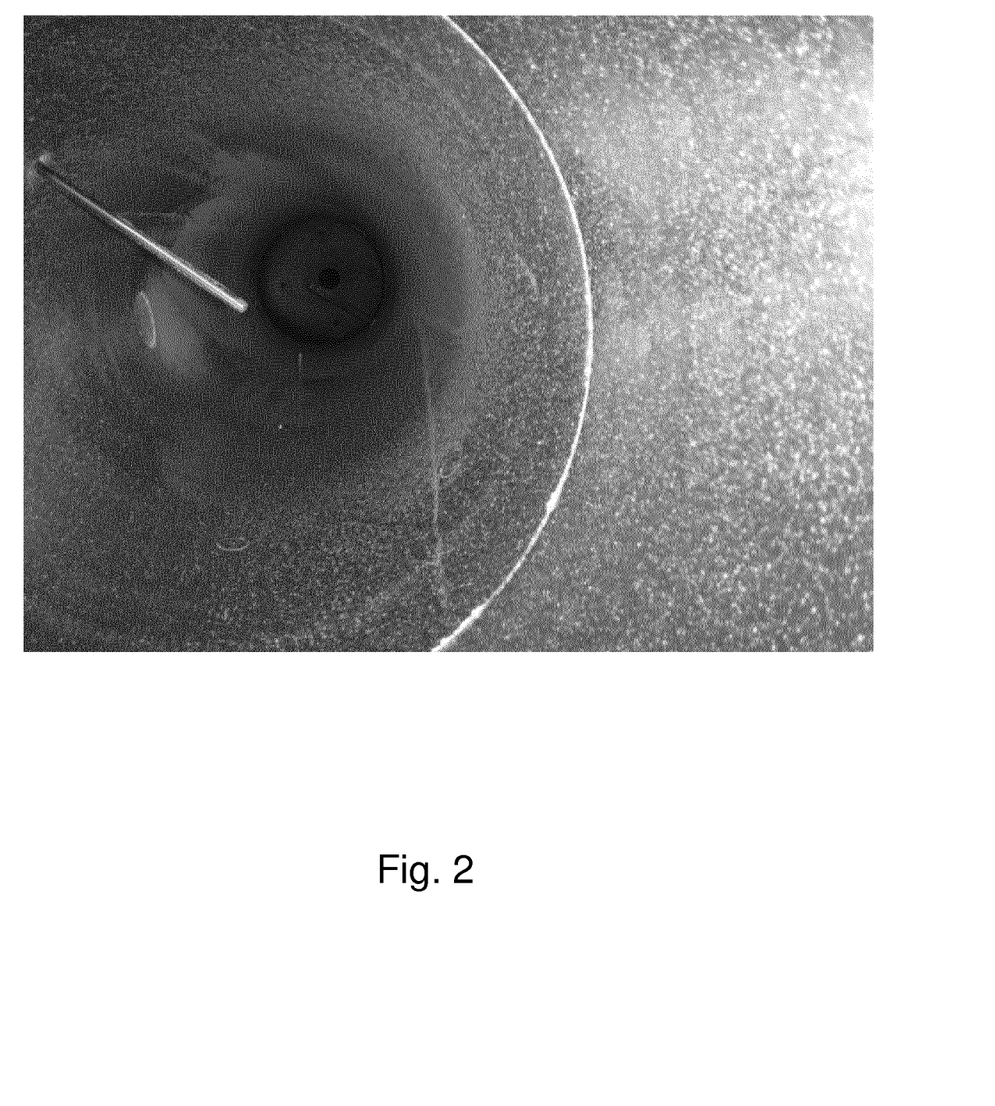
FIG. 2 shows the inner reactor surface after an exemplified polymerization run.

Visual inspection of the reactor surface (FIG. 2) showed that clean walls; in other words, there was no formation of sheeting or adhesion of polymer particles. The presence of the antistatic agent did not negatively affect the catalyst activity.

Example 2C (Comparative)

Preparation of the Ziegler-Natta Solid Catalyst Component

Prepared in accordance with example 1 of European Patent Application No. EP 728770 with the difference that the diameter of the spherical adduct particles was 60 micron.

Catalyst Activation, Prepolymerization and Polymerization

Figure 3:
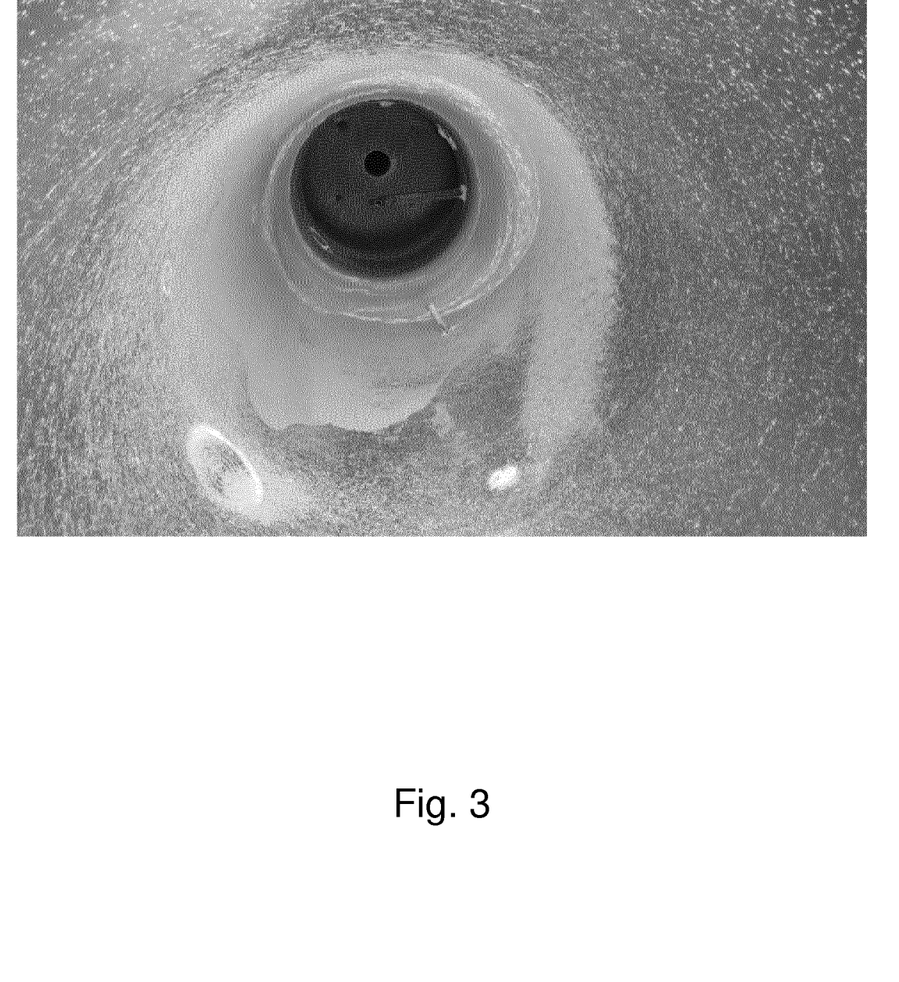
FIG. 3 shows the inner reactor surface after a comparative polymerization.

Example 1 was repeated with slight condition differences indicated in Table 1 and with the additional difference that the antistatic composition was fed into the polymer bed via the injection point 22 on line 7 exiting from the prepolymerization reactor 5. In this case, the antistatic effect was lower, as reported in Table 1. Visual inspection of the reactor surface (FIG. 3) showed that the reactor surface was severely fouled.

TABLE 1

| Example | 1 | 2C |
|---|---|---|
| Precontact | | |
| Temperature (° C.) | 20 | 20 |
| Residence time (min) | 10 | 10 |
| TEAL/catalyst (g/g) | 4 | 4 |
| TEAL/donor ratio (g/g) | 4 | 10 |
| Prepolymerization | | |
| Temperature (° C.) | 20 | 20 |
| Residence time (min) | 35 | 35 |
| Gas-Phase reactor | | |
| Temperature (° C.) | 70 | 70 |
| Pressure (barg) | 17 | 18 |
| Residence time (min) | 50 | 58 |
| $C_2$-/$C_2$- + $C_3$- (mol/mol) | 0.027 | 0.026 |
| $H_2$/$C_3$- (mol/mol) | 0.006 | 0.004 |
| Mileage (kg/g) | 4600 | 2500 |
| Antistatic composition (ppm wt) | 135 | 140 |
| Polymer analysis | | |
| MFR "L" (dg/min) | 1.8 | 6.8 |
| Ethylene content (wt %) | 3.4 | 3.2 |
| Xylene solubles (wt %) | 4.2 | 5.5 |
| Effect of antistatic composition | | |
| Reactor surface | Clean | fouled |
| Operability | Stable | unstable |

Notes:
$C_2$- = ethylene; $C_3$- = propylene; $H_2$ = hydrogen; Split = amount of polymer prepared in the concerned reactor referred to the total weight; Mileage = amount of obtained polymer per amount of catalyst fed to the polymerization.

What is claimed is:

1. A method for feeding a fluid into a polymer bed of a fluidized bed gas phase polymerization reactor comprising the step of:
   introducing a controlled and continuous flow rate of the fluid into the polymer bed through a distributor protruding into the fluidized bed zone of the reactor and terminating with a discharge end positioned so that the following equation is fulfilled:

$$d/D > 0.002$$

wherein d is the distance of the distributor's discharge end from the wall of the reactor, and D is the diameter of the reactor in the fluidized bed zone
   wherein a head loss is generated through orifices in the distributor such that a Reynolds number (Re) of from 10000 to 700000 is achieved.

2. The method according to claim 1, wherein the fluid is an antistatic composition comprising (with respect to the total weight of the antistatic composition):
   (a) from 0.5 to 50% by weight of a compound of formula R—OH wherein R represents hydrogen or a linear or branched, saturated alkyl group having from 1 to 15 carbon atoms; and
   (b) from 50 to 99.5% by weight of an oligomeric or polymeric organic compound having one or more terminal hydroxyl groups and a viscosity at 40° C. of at least 20 mm$^2$/sec (DIN 51562).

3. The method according to claim 2 further comprising the step of feeding the antistatic composition or individual components thereof to the polymerization reactor in a flow of saturated or unsaturated hydrocarbon having from 2 to 6 carbon atoms.

4. The method according to claim 2, wherein the compound (a) of formula R—OH is water.

5. The method according to claim 2, wherein the oligomeric or polymeric organic compound (b) is an alkylene-oxide-derived polymer comprising on average from 10 to 200 repeating units —(CH2—CHR—O)—, with R being hydrogen or an alkyl group having from 1 to 6 carbon atoms.

6. The method according to claim 2, wherein the amount of component (a) in the antistatic composition introduced into the polymerization reactor is from 0.5 to 50% by weight with respect to the total weight of antistatic composition, and the amount of component (b) in the antistatic composition introduced into the polymerization reactor is from 50 to 99.5% by weight with respect to the total weight of antistatic composition.

7. The method according to claim 1, wherein the fluid is a catalyst or catalyst component.

8. The method according to claim 1 further comprising the step of homogenizing the antistatic composition or components and the hydrocarbon inside the distributor.

9. A fluidized bed gas phase polymerization reactor comprising:
a distributor protruding into the fluidized bed zone of the reactor and terminating with a discharge end positioned so that the following equation is fulfilled:

$$d/D > 0.002$$

wherein d is the distance of the distributor's discharge end from the wall of the reactor, and D is the diameter of the reactor in the fluidized bed zone.

10. A process for the preparation of polyolefins comprising the step of:
feeding a fluid into a polymer bed of a fluidized bed gas phase polymerization reactor by introducing a controlled and continuous flow rate of the fluid into the polymer bed through a distributor protruding into the fluidized bed zone of the reactor and terminating with a discharge end positioned so that the following equation is fulfilled:

$$d/D > 0.002$$

wherein d is the distance of the distributor's discharge end from the wall of the reactor, and D is the diameter of the reactor in the fluidized bed zone wherein a head loss is generated through orifices in the distributor such that a Reynolds number (Re) of from 10000 to 700000 is achieved.

11. The process according to claim 10, wherein the polymerization is carried out using a Ziegler-Natta catalyst comprising:
(i) a solid catalyst component comprising Mg, Ti, an halogen and a first electron donor compound (internal donor),
(ii) an alkylaluminum compound, and
(iii) optionally, a second electron-donor compound (external donor).

* * * * *

UNITED STATES PATENT AND TRADEMARK OFFICE
CERTIFICATE OF CORRECTION

PATENT NO. : 10,792,637 B2
APPLICATION NO. : 16/477283
DATED : October 6, 2020
INVENTOR(S) : Balestra et al.

It is certified that error appears in the above-identified patent and that said Letters Patent is hereby corrected as shown below:

On the Title Page

Column 1, Item (30), Line 1, delete "17152464" and insert -- 17152464.8 --, therefor In the Specification In Column 3, Line 66, delete "-µ($CH_2$-$CH_2$-O)$_n$–" and insert -- –($CH_2$-$CH_2$-O)$_n$– --, therefor In Column 5, Line 16, delete "hydrocathon" and insert -- hydrocarbon --, therefor In Column 5, Line 20, delete "hydrocathon" and insert -- hydrocarbon --, therefor Signed and Sealed this
Third Day of January, 2023

Katherine Kelly Vidal
*Director of the United States Patent and Trademark Office*